April 13, 1965 J. KIRSCH 3,178,166
CONSTANT-PRESSURE HYDRAULIC FLOW CONTROL APPARATUS
Filed Feb. 20, 1961 2 Sheets-Sheet 1
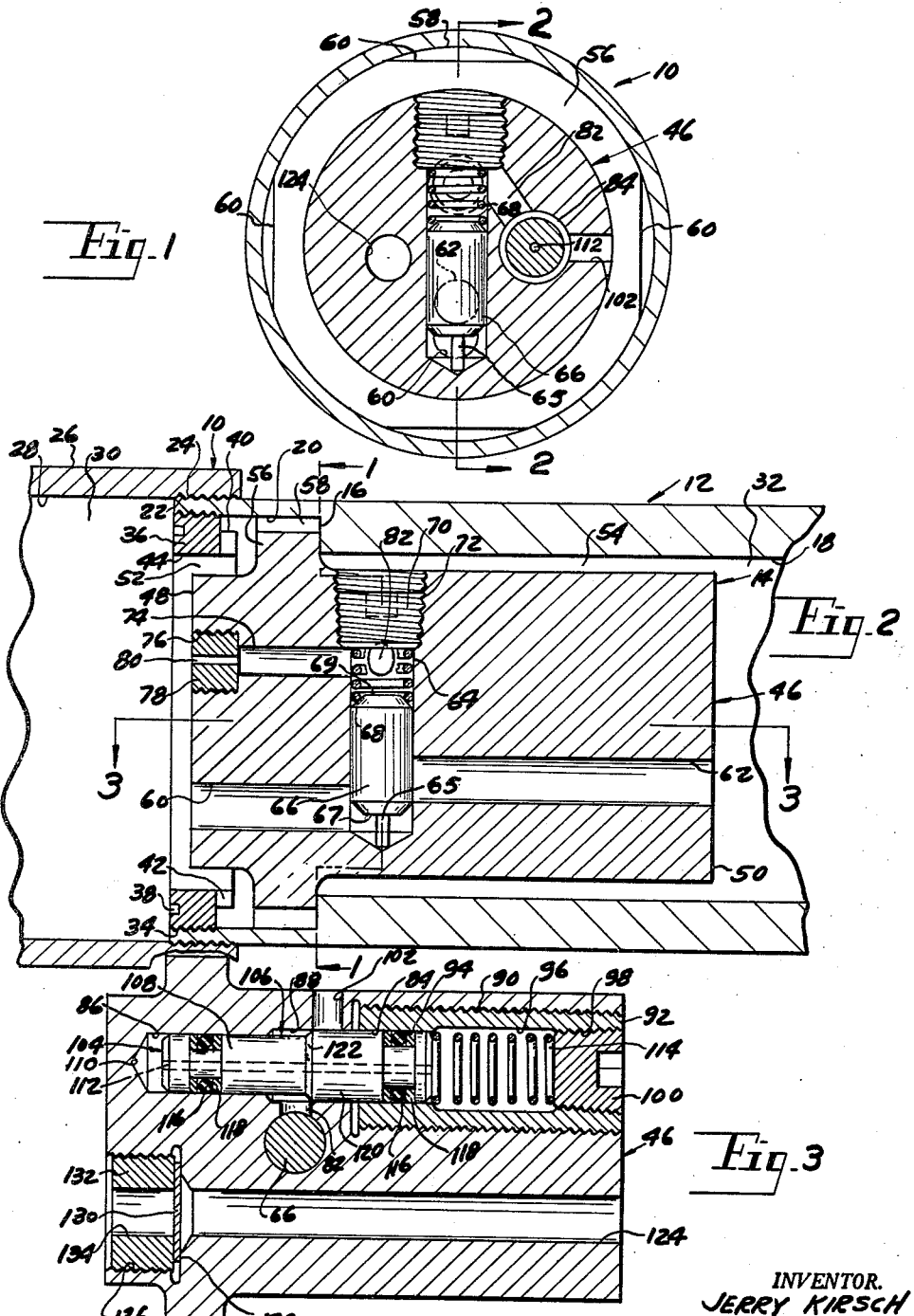
INVENTOR.
JERRY KIRSCH
BY Barthel & Bugbee
ATTORNEYS April 13, 1965    J. KIRSCH    3,178,166
CONSTANT-PRESSURE HYDRAULIC FLOW CONTROL APPARATUS
Filed Feb. 20, 1961    2 Sheets-Sheet 2

INVENTOR.
JERRY KIRSCH
BY Barthel & Bigbee
ATTORNEYS

United States Patent Office 3,178,166
Patented Apr. 13, 1965

3,178,166
CONSTANT-PRESSURE HYDRAULIC FLOW
CONTROL APPARATUS
Jerry Kirsch, 3946 Bishop, Detroit 24, Mich.
Filed Feb. 20, 1961, Ser. No. 90,378
8 Claims. (Cl. 267—1)

This invention relates to hydraulic valves and, in particular, to hydraulic flow control valves.

One object of this invention is to provide a hydraulic flow control valve which will maintain a constant pressure on the upstream side of the valve, regardless of the rate of flow of hydraulic fluid through the valve and also regardless of back pressure from the downstream side of the valve so long as the hydraulic pressure on the upstream side exceeds or equals the pressure on the downstream side.

Another object is to provide a hydraulic flow control valve of the foregoing character which does not require venting either to the atmosphere or to a tank or other fluid reservoir, whereby the flow control valve of this invention may be operated in a submerged condition or within a conduit or cylinder lacking such a venting arrangement or wherein such a venting arrangement is impractical or infeasible.

Another object is to provide a flow control valve of the foregoing character wherein the valve mechanism is mounted in a reciprocable valve body which is movable onto or off a seat in order to permit free flow of hydraulic fluid in one direction and provide only controlled flow of hydraulic fluid in the opposite direction.

Another object is to provide a hydraulic flow control valve of the foregoing character wherein the reciprocable valve body itself contains a pressure responsive auxiliary valve member which controls flow through passageways in the valve body between the upstream and downstream sides thereof in such a manner as to maintain a constant pressure of hydraulic fluid on the upstream side of the valve.

Another object is to provide a modified flow control valve as set forth in the first two objects above, wherein the valve mechanism is mounted in a stationary valve body containing a check valve permitting substantially free flow of hydraulic fluid in one direction with controlled flow of hydraulic fluid in the opposite direction.

Other objects and advantages of the invention will become apparent during the course of the following description of the accompanying drawings, wherein:

FIGURE 1 is a cross-section taken along the line 1—1 in FIGURE 2, through a hydraulic flow control valve according to one form of the invention wherein the valve body reciprocates relatively to its mounting, with the main flow control valve member in its closed position, shutting off fluid flow through the valve body;

FIGURE 2 is a vertical longitudinal section taken along the line 2—2 in FIGURE 1;

FIGURE 3 is a horizontal longitudinal section through the valve body, with the mounting casing or conduit omitted, taken along the line 3—3 in FIGURE 2;

Figure 4:
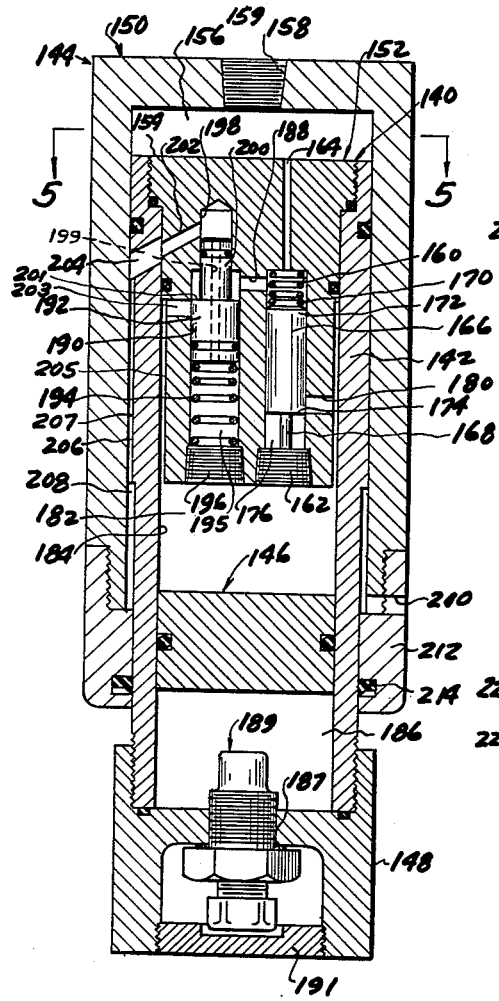
FIGURE 4 is a horizontal longitudinal section through a modified hydraulic flow control valve, according to another form of the invention, wherein the valve body remains stationary relatively to its mounting.

Referring to the drawings in detail, FIGURES 1 to 3 inclusive show a hydraulic flow control valve, generally designated 10, according to one form of the invention as including a mounting casing or conduit 12 and a reciprocable valve unit 14 installed therein for motion toward and way from an annular valve seat 16 in the form of an annular shoulder between the casing bore 18 and an enlarged diameter casing counterbore 20. The casing 12 is preferably of tubular form and externally-threaded as at 22 for the reception of the internally-threaded portion of a hydraulic fluid supply casing or conduit 26. The bore 28 of the supply casing or conduit 26 encloses an upstream hydraulic chamber or space 30, whereas the bore 18 of the valve casing 12 encloses a downstream chamber or space 32 which is at a lower pressure than the pressure in the upstream space 30, or at least at a pressure equal thereto.

The casing counterbore 20 is internally threaded as at 34 (FIGURE 2) to receive an externally-threaded retaining ring 36 containing spanner holes or recesses 38 on its outer side. On its inner side, the retaining ring 36 is provided with a stop flange 40 of smaller diameter than the external diameter of the retaining ring 36 and provided with radial fluid passageways 42 connecting the counterbore 20 with the retaining ring bore 44, which in turn leads into the upstream space or chamber 30.

The chambers 30 and 32 of the casings 26 and 12 are separated from one another by an elongated approximately cylindrical valve body, generally designated 46, having upstream and downstream end surfaces 48 and 50 respectively of smaller diameters than the bores 44 and 18 in which they lie so as to provide annular passageways 52 and 54 respectively communicating with the upstream and downstream spaces 30 and 32 and separated from one another by a generally annular radial flange 56 containing longitudinal fluid channels 58 formed by chordal flat spots or cutaway portions 60 (FIGURE 1) disposed at intervals around the periphery of the flange 56. The flange 56 of the valve body 46 is normally urged into engagement with the annular radial shoulder or valve seat 16 so as to halt fluid flow through the channels 58 in response to an excess of pressure in the upstream space 30 over that existing in the downstream space 32.

The valve body 46 contains longitudinal upstream inlet and downstream outlet fluid passageways 60 and 62 respectively (FIGURE 2) offset slightly laterally from one another and leading into a transverse approximately radial main valve bore 64, the closed inner end of which is engaged by the axially-projecting stop portion 65 of a main cylindrical valve plunger 66 reciprocablly mounted in the valve bore 64. The valve plunger 66 has outer and inner piston head areas 67 and 69 respectively, and is urged toward a position closing the outlet passageway 62 by a compression spring 68 of force sufficient to overcome the frictional drag of the valve plunger 66. The opposite end of the valve spring 68 is seated against a screw plug 70 threaded into a threaded counterbore 72 at the open outer end of the valve bore 64. Communicating with the outer end of the valve bore 64 is a longitudinal fluid passageway 74 terminating at its upstream end in a threaded counterbore 76 closed by a screw plug 78 containing a restricted diameter or capillary orifice 80, like a pinhole, connecting the upstream space 30 to the passageway 74. In one form of the invention as actually constructed, this orifice had a diameter of five one-thousandths (0.005") of an inch.

Leading from the inner end of the transverse radial valve bore 64 adjacent the screw plug 70 is a fluid passageway 82 which extends downward (FIGURE 1) into a stepped longitudinal auxiliary valve bore 84. The auxiliary valve bore 84 includes a small diameter dead end forward portion 86 (FIGURE 3), a larger diameter intermediate portion 88 and an internally-threaded still larger diameter rearward portion 90 into which an externally-threaded tubular adjusting screw 92 is threaded. The screw 92 in turn contains a forward bore 94 of the same diameter as the intermediate bore 88 and coaxial therewith, a middle bore 96, and an internally-threaded end bore 98 containing a threaded closure plug 100.

The passageway 82 extends from the transverse bore 64 into the forward end of the intermediate bore 88 (FIGURE 3) and a transverse port 102 extends from the rearward portion of the intermediate bore 88 through the side wall of the valve body 46 and opens into the annular space or passageway 54 (FIGURE 2).

Reciprocably mounted in the stepped auxiliary valve bore 84 and with it constituting a flow control valve unit, generally designated 104 (FIGURE 3), is a reciprocable stepped auxiliary valve plunger 106, the forward small-diameter portion 108 of which reciprocates within the small-diameter bore 86 and lies adjacent an end chamber 110 formed by the dead dead of the small diameter bore 86. A central air relief passageway 112 extends entirely through the auxiliary valve plunger 106 and connects the end chamber 110 with the middle bore 96. The latter contains a relatively light compression spring 114 seated against the threaded plug 100 and normally engaging and urging the piston valve plunger 106 toward the end chamber 110. The spring 114 controls the operating pressure, and in one form of the invention, was a thirty-pound spring. Near its opposite ends the auxiliary valve plunger 106 is annularly grooved to receive conventional sealing O-rings 116 mounted between back-up washers 118. The auxiliary valve plunger 106 has an enlarged rearward end portion 120 connected to the forward portion 108 with an annularly-shouldered piston area 122 therebetween. The portion 120 reciprocates in the bores 88 and 94 and also acts as a piston valve head to cover and uncover the inner end of the port 102.

Extending lengthwise through the valve body 46 (FIGURES 1 and 3) is a fluid safety discharge passageway 124 which opens into an internally-threaded counterbore 126, thereby providing an annular shoulder 128 therebeetween for receiving a rupturable sealing disc 130 held in position by a tubular threaded plug 132 containing a central passageway 134. The latter, upon rupture of the disc 130 in response to its being subjected to an excessive pressure, establishes communication directly with the passageway 124 for bypassing the flow of fluid through the valve body 46 from the upstream chamber 30 to the downstream chamber 32, as described below in connection with the operation of the form of the invention shown in FIGURES 1 to 3 inclusive.

In the operation of the hydraulic flow control valve 10 of FIGURES 1 to 3 inclusive, let it be assumed that the upstream chamber 30 has been filled with hydraulic pressure fluid and that this fluid has seeped through the restricted diameter or capillary orifice 80 into the passageways 74 and 82 to fill the intermediate bore 88 adjacent the annular piston area 122 on the auxiliary valve member 106. At the same time, hydraulic fluid also has filled the longitudinal or main fluid inlet passageway 60, but has been prevented from entering the main discharge fluid passageway 62 by the blocking action of the main valve member 66 in its position as shown in FIGURE 2.

Let it now be assumed that hydraulic fluid at a pressure higher than the predetermined limiting or set pressure of the valve 10, as determined by the force of the spring 114, is admitted to the upstream hydraulic fluid chamber 30. When this occurs, the pressure acts against the outer head area 67 of the main valve member 66 and pushes it toward the threaded plug 70, overcoming the opposing thrust of the spring 68. Meanwhile, hydraulic fluid at the excessive pressure can pass through the restricted diameter passageway 80 only very slowly, because of its capillary dimensions. The inward motion of the main valve member 66 presses against the hydraulic fluid in the inner end portion of its bore 64 and in the passageways 74 and 82, forcing this hydraulic fluid into the intermediate valve bore 88 where it acts against the annular piston area 122 to shift the auxiliary valve member 106 to the right (FIGURE 3), overpowering the pressure control spring 114 and uncovering the side port 102. This releases fluid from the intermediate valve bore 88 into the downstream chamber 32 and, because of the restricted diameter of the orifice 80, causes a pressure drop in the passageway 74. Meanwhile, air passes freely between the end chambers 96 and 110 through the auxiliary valve member relief passageway 112, preventing the compression of such air from affecting the spring 114. If hydraulic fluid leaking past the O-rings 116 fills the end chambers 96 and 110 so as to lock the auxiliary valve member 106 against motion, the safety disc 130 ruptures to relieve the pressure in the upstream chamber 30 and release hydraulic fluid directly into the downstream chamber 32.

The inward motion of the main valve member 66 opens communication between the chambers 30 and 32 by way of the main passageways 60 and 62, reducing the hydraulic pressure in the upstream chamber 30. This permits the pressure control spring 114 to urge the auxiliary valve member 106 to the left (FIGURE 3), so as to cut down or cut off fluid flow through the side port 102 from the intermediate bore 88. Flow of fluid through the orifice 80 then equalizes the pressure on the opposite ends 67 and 69 of the main valve plunger 66 at a speed governed by the size of the orifice 80. This permits the spring 68 to move the main valve plunger 66 outward toward its closing position so as to reduce the direct flow of hydraulic fluid from the main passageway 60 into the main passageway 62. This throttling action occurs with a "hunting" motion of the main valve plunger 66 back and forth as it seeks to reach a position of equilibrium because its throttling or closing action causes the hydraulic pressure to rise again temporarily in the upstream chamber 30. During this flow control operation, the auxiliary valve plunger 106 acts to constantly bleed off hydraulic pressure fluid through the side port 102 faster than it can flow into the passageways 74 and 82 through the restricted diameter or capillary orifice 80.

Thus, the valve 10 of the present invention maintains a constant hydraulic pressure in the upstream chamber 30, regardless of the inflow of hydraulic pressure fluid into the upstream chamber 30 or, if the upstream chamber 30 happens to be the main hydraulic chamber of a hydraulic cylinder as in FIGURE 4, regardless of the speed of closing of the piston or cylinder, whichever is the moving element. At the same time, air can pass freely through the longitudinal relief passageway 112 of the auxiliary valve member 106 between the end chamber 110 of the bore 86 and the pilot spring chamber or bore 96 as the auxiliary valve plunger 106 moves back and forth. This action prevents the air otherwise compressed in these chambers from affecting the force exerted by the pressure-regulating spring 114.

If the flow of hydraulic fluid is reversed, so that the pressure in the downstream chamber 32 exceeds that in the upstream chamber 30, hydraulic pressure acting against the downstream end surface 50 of the valve body 46 moves the valve body 46 as a unit to the left (FIGURE 2), so as to act as a check valve, causing the flange 56 thereof to move off the annular valve seat 16 until it halts against the stop flange 40. Hydraulic fluid is then free to pass from the downstream chamber 32 through the annular space 54, channels 58 formed by the flat spots 60, radial fluid passageways 42 and longitudinal annular passageway 50 into the upstream chamber 30. Resumption of direct or forward flow of fluid by supplying hydraulic pressure fluid to the upstream chamber 30 causes such fluid to act against the upstream end surface 48 of the valve body 46 so as to shift the latter to the right until the flange 56 seats against the annular shoulder 16, cutting off further direct flow through the peripheral channels 54, 58, 42, 52 just described.

As mentioned above, if a substantial amount of oil were to leak past the O-rings 116 and 118 into the spring chamber, the build up in pressures would be high and could cause a hydraulic lock preventing the movement of the plunger 106, indirectly allowing pressures to reach dangerous levels on the upstream side 30. This would rupture the safety disc 130 (FIGURE 3), thereby establishing direct flow of fluid through the valve body 46 by way of the passageways 124 and 134. Normally, however, the safety disc 130 prevents direct interflow of fluid between the upstream and downstream chambers 30 and 32, except by way of the passageways, channels and valves described above.

Figure 5:
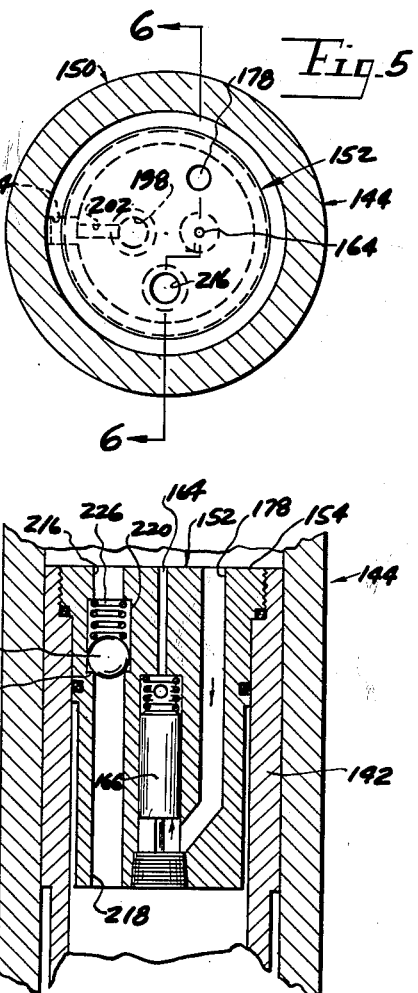
FIGURE 5 is a cross-section taken along the line 5—5 in FIGURE 4.
Figure 6:
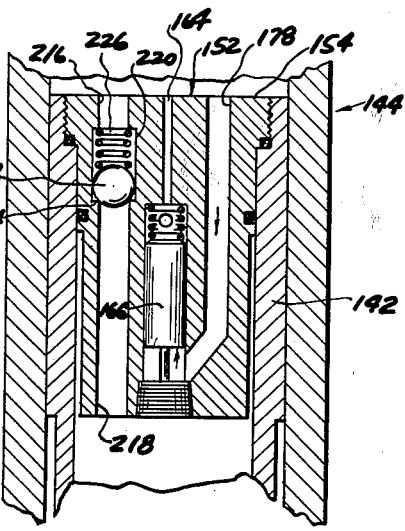
FIGURE 6 is a longitudinal section in a plane at right angles to the section plane of FIGURE 4, taken along the line 6—6 in FIGURE 5.

The modified flow control valve, generally designated 140, shown in FIGURES 4, 5 and 6 is illustrated as installed fixedly in the head of a tubular piston 142 reciprocable within a hydraulic cylinder 144. The tubular piston 142 contains a "free" or floating piston 146 reciprocable loosely therein and is connected to a closure cap 148. The tubular piston 142 with its flow control valve unit 140, hydraulic chamber 144, free piston 146 and closure cap 148 collectively form a reciprocable hydraulic motor 150.

The flow control valve 140 consists of a flanged valve body 152 threaded into the upper or inner end of the tubular piston 142 so as to form the head thereof, with an end surface 154 disposed in a main hydraulic chamber 156 forming an "upstream" or higher pressure chamber, and served by a threaded port 158 closed by a threaded plug 159. The valve body 152 contains a main valve bore 160 closed at one end by a threaded plug 162 and entered at its other end by a restricted diameter or capillary or pinhole passageway 164 (FIGURE 4). This is of approximately pin-hole size, like the capillary passageway 80 of FIGURE 1, and for the same purpose. Reciprocably mounted within the main valve bore 160 is a main valve plunger 166 provided with a reduced diameter nose or stop portion 168 adapted to contact the inner end of the threaded plug 162 to limit the downward motion of the main valve member 166. A coil spring 170 engages the upper end surface 172 of the main valve plunger 166 and urges it downward, whereas an annular piston area 174 on the lower end of the main valve plunger 166 is reached by hydraulic fluid entering the chamber 176 surrounding the stop portion 168 through a longitudinal passageway 178 (FIGURE 6) leading from the upper end of the valve body 152.

The main valve plunger 166 adjacent its lower end portion 174 normally covers and closes a side port 180 leading into the intermediate chamber 182 formed by the intermediate portion of the tubular piston bore 184 within which the floating or the free piston 146 is reciprocable. The intermediate chamber 182, like the main chamber 156, contains hydraulic fluid. Below the floating or free piston 146 is located a lower or pneumatic chamber 186 situated in the lower end of the tubular piston bore 184. The pneumatic chamber 186 is closed at its lower end by the closure cap member 148 threaded onto the lower end of the tubular piston 142. The closure cap 148 is connected to the mechanism or seated in a supporting structure, depending upon whether or not the tubular piston 142 is a moving element or a stationary element. The closure member or cap 148 is drilled and threaded at 187 to receive a pneumatic fluid filling valve 189 by means of which the pneumatic chamber 186 is filled with compressed nitrogen or other suitable compressed gas. A closure plug 191 conceals the valve 14.

Opening out of the upper end of the main valve bore 160 adjacent the spring 170 is a passageway or port 188 (FIGURE 4) leading to an auxiliary valve bore 190 containing a reciprocable auxiliary valve plunger 192 urged upwardly by a light control or pressure-regulating spring 194 in a spring chamber 195. The springs 170 and 194, like the springs 68 and 114 of FIGURES 2 and 3, are of the order of ten-pound and thirty-pound force for one particular form of valve. A threaded plug 196 closes the lower end of the auxiliary valve bore 190, whereas its upper end terminates in a reduced diameter bore 198 in which the reduced diameter upper end portion 200 of the auxiliary valve plunger 192 reciprocates. Aligned vent ports 202 and 204 in the valve body 152 and tubular piston 142 respectively open into a vent passageway 206 and annular chamber 208 vented by an external vent port 210 to the atmosphere. This enables leakage fluid to escape to the atmosphere or to a suitable receptacle. The lower end of the cylinder 144 is closed by an annular closure collar 212 threaded thereon and containing a part of the vent port 210. The closure collar 212 is grooved to receive a packing or wiping ring 214.

The valve body 152 is additionally provided with longitudinal fluid passageways 216 and 218 (FIGURE 6) opening into the opposite ends of a check valve chamber 220 containing a check valve ball 222 urged against an annular seat 224 by a compression spring 226. This arrangement permits free return flow of hydraulic fluid from the intermediate or downstream chamber 182 to the main or upstream chamber 156.

In the operation of the hydraulic fluid flow control apparatus 150 of FIGURES 4, 5 and 6, let it be assumed, for example, that the closure cap 148 is mounted in a stationary condition, such as in the stationary half of a die set and that the hydraulic cylinder 144 is mounted in or connected to the movable half of the die set which in turn is connected to the reciprocable platen of a conventional press. Let it also be assumed that the upstream chamber 156 and intermediate chamber 182 have been filled with oil or other suitable hydraulic fluid by inserting it through the threaded port 158. Let it also be assumed that the lower or pneumatic chamber 186 has been charged with compressed nitrogen or other suitable compressed gas by way of the pneumatic fluid filling valve 189, the closure plug 191 being of course temporarily removed for that purpose. In order to avoid stalling the hydraulic valve action, it will be evident that the pneumatic pressure in the lower or pneumatic chamber 186 must not equal or exceed the hydraulic pressure reached in the upper or upstream hydraulic chamber 156.

Let it further be assumed that the die halves and consequently the cylinder 144 and piston 142 have been opened or extended relatively to one another to their maximum extent, namely to the opposite end of the stroke from that shown in FIGURE 4 which is the closed position thereof, and that the press platen and upper die half of the die set are started downward in their travel by the normal action of the press during its working stroke. As the die halves approach one another and consequently the cylinder 144 moves downward relatively to the piston 142, hydraulic fluid such as oil is forced from the upper or upstream chamber 156 through the passageway 178 (FIGURE 6) into the lower portion of the main valve bore 160 beneath the lower piston area 174 (FIGURE 4), where it acts against the main valve plunger 166 to force it upward against the thrust of the spring 170.

Meanwhile, oil has also passed through the capillary or restricted diameter passageway 164 into the upper end of the main valve bore 160, filling it, the connecting passageway 188 and the upper end of the valve bore 190 with hydraulic fluid. When the hydraulic pressure in the upper or upstream chamber 156 becomes sufficiently great to overcome the thrust of the pressure-regulating spring 170, the main valve plunger 166 moves upward, pushing the hydraulic fluid behind it through the passageway 188 into the upper end of the auxiliary valve bore 190 (FIGURE 4). While this is occurring, the fluid in the upper end of the main valve bore 160 will be very little affected by the presence of the capillary or restricted diameter passageway 164 because of its pinhole dimensions which render it capable of conducting only very small amounts of fluid out of the chamber 156 in a given time.

The pressure fluid reaching the upper end of the auxiliary valve bore 190 in this manner acts against the annular piston area 201 and urges the auxiliary valve plunger 192 downward against the thrust of the control spring or pressure-regulating spring 194. An excessive pressure in the upper or upstream chamber 156 beyond that which permits the pressure-regulating valve spring 194 to hold the auxiliary valve plunger 192 in its closed position overcomes the thrust of the pressure-regulating spring 194 and forces the auxiliary valve member 192 downward, causing the piston surface 201 thereof to move past the mouth of the port 203, permitting fluid to escape therethrough by way of the clearance space 207 into the intermediate hydraulic chamber 182. The accumulation of pressure fluid in the intermediate chamber 182 acts against the free or floating piston 146 and forces it downward toward the closure cap 148, further compressing the compressed gas in the lower or pneumatic chamber 186. In this manner, the auxiliary valve plunger 192 bleeds off hydraulic fluid from the upper ends of the main valve bore 160 and auxiliary valve bore 190 and the main and auxiliary valve plungers 166 and 192 return to their closed positions as a result of the action of their respective springs 170 and 194.

Meanwhile, hydraulic fluid leaking past the auxiliary valve plunger 192 into the spring chamber 195 can pass freely through the fluid relief passageway 199 in the plunger 192 to the upper end of the reduced diameter bore 198 and thence through the vent passageways 202, 204, 206, 208 and 210 to a collection point. This prevents entrapment of hydraulic fluid in the spring chamber 195 and consequently prevents locking of the auxiliary valve plunger 192 by the presence of such fluid.

In the meantime, the pressure fluid passing down the passageway 178 (FIGURE 6) from the upper hydraulic chamber 156 into the chamber 176 at the lower end of the main valve bore 160, in moving the main valve plunger 166 upward has uncovered the mouth of the port 180, releasing hydraulic fluid directly into the port 180 and thence through the clearance space 207 into the intermediate hydraulic chamber 184, relieving the pressure in the upper hydraulic chamber 156. In this manner, the pressure in the upper hydraulic chamber 156 is maintained substantially constant, regardless of the speed of closing of the hydraulic cylinder 144 relatively to the hydraulic piston 142.

Upon reversal of the press platen so as to move the cylinder 144 upward relatively to the piston 142, the suction thereby created in the upper hydraulic chamber 156 acts through the longitudinal fluid passageway 216 (FIGURE 6) in the valve body 152 to overcome the downward thrust of the check valve spring 226 and draw the check valve ball 222 upward off its seat 224. This action permits hydraulic fluid to be drawn from the intermediate hydraulic chamber 182 through the longitudinal passageways 218 and 216 directly into the upper chamber 156, refilling the latter and at least partially emptying the intermediate hydraulic chamber 182. The emptying of the intermediate hydraulic chamber 182 is enhanced and accelerated by the pressure exerted upon it by the free piston 146 as the latter is forced upward by the pressure of the compressed gas in the lower or pneumatic chamber 186.

It will be evident from FIGURE 4 that in place of the compressed gas in the lower chamber 186, a suitable spring may be used, such as a compression coil spring with its upper end engaging the floating piston 146 and with its lower end abutting the inner end of the closure cap 148. In such instance the charging valve 189 and closure plug 191 are removed and the resulting orifice 187 serves as an air vent to prevent air compression in the lower chamber 186 from affecting the force exerted by the spring.

What I claim is:

1. A constant-pressure hydraulic flow control apparatus comprising inlet and outlet hydraulic fluid casings disposed adjacent one another and defining upstream and downstream hydraulic fluid chambers respectively, a valve body disposed between said casings in chamber-separating relationship therewith, said valve body containing main and auxiliary valve bores and independent main and auxiliary inlet and outlet passageways extending from spaced inlet ports on the upstream side of said valve body by way of said main and auxiliary valve bores between said upstream and downstream chambers respectively, main and auxiliary valve plungers reciprocable respectively in said main and auxiliary valve bores between passageway-opening and passageway-closing positions, said auxiliary valve plunger having a piston area thereon communicating with said auxiliary inlet passageway, and resilient means urging said valve plungers toward their respective passageway-closing positions, said auxiliary inlet passageway leading from its respective inlet port on said upstream of said valve body to said main valve bore on the opposite side of said valve body to said main valve bore on the opposite side of said main valve plunger from said main inlet passageway, said auxiliary inlet passageway having therein a fluid flow retardation portion of minute diameter.

2. A constant-pressure hydraulic flow control apparatus, according to claim 1, wherein said valve body has a spring chamber adjacent one end of said auxiliary valve bore, said auxiliary valve plunger urging means being disposed in said spring chamber, said valve body having an internally-threaded bore therein, and a tubular adjusting screw containing said spring chamber being adjustably threaded into said internally-threaded bore.

3. A constant-pressure hydraulic flow control apparatus, according to claim 1, wherein said inlet casing comprises a cylinder and said outlet casing a hollow piston reciprocably mounted in said cylinder, and wherein said valve body is fixedly mounted in said hollow piston.

4. A constant-pressure hydraulic flow control apparatus, according to claim 3, wherein said hollow piston has an perture in the inner end thereof and wherein said valve body is mounted in said aperture.

5. A constant-pressure hydraulic flow control apparatus, according to claim 3, wherein said valve body has a spring chamber adjacent one end of said auxiliary valve bore, said auxiliary valve plunger urging means being disposed in said spring chamber, and wherein said relief passageway communicates with said spring chamber.

6. A constant-pressure hydraulic flow control apparatus, according to claim 5, wherein said piston has a vent passageway leading from one end of said auxiliary valve bore to a location externally of said piston and wherein said cylinder has a vent port to the exterior thereof communicating with said vent passageway.

7. A constant-pressure hydraulic flow control apparatus, according to claim 1, wherein said auxiliary valve bore is disposed with its longitudinal axis substantially parallel to the longitudinal axis of said main valve bore.

8. A constant-pressure hydraulic flow control apparatus, comprising
   inlet and outlet hydraulic fluid casings disposed adjacent one another and defining upstream and downstream hydraulic fluid chambers respectively,
   a valve body disposed between said casings in chamber-separating relationship therewith,
      said valve body containing main and auxiliary valve bores and independent main and auxiliary inlet and outlet passageways extending from spaced inlet ports on the upstream side of said valve body by way of said main and auxiliary valve bores between said upstream and downstream chambers respectively,
   main and auxiliary valve plungers reciprocable respectively in said main and auxiliary valve bores between passageway-opening and passageway-closing positions,
      said auxiliary valve plunger having a piston area thereon communicating with said auxiliary inlet passageway,
   and resilient means urging said valve plungers toward their respective passageway-closing positions,
      said auxiliary inlet passageway leading from its respective inlet port on said upstream side of said valve body to said main valve bore on the opposite side of said main valve plunger from said main inlet passageway, said auxiliary inlet passageway having therein a fluid flow retardation portion of minute diameter, one of said casings having an annular valve seat therein, said valve body being movably mounted in said one casing and having a peripheral shouldered portion movable into and out of fluid-flow halting relationship with said valve seat in response to flow of fluid in opposite directions relative to the other casing.

References Cited by the Examiner
UNITED STATES PATENTS

| | | | |
|---|---|---|---|
| 2,333,522 | 11/43 | Clifton | 137—491 |
| 2,385,545 | 9/45 | Simpson | 188—96.2 |
| 2,625,174 | 1/53 | Forde | 137—491 |
| 2,661,763 | 12/53 | Renick | 137—493 |
| 2,930,398 | 3/60 | Barrett et al. | 137—489 |
| 3,040,771 | 6/62 | Droitcour et al. | 137—489.3 |

M. CARY NELSON, *Primary Examiner.*

ISADOR WEIL, MARTIN P. SCHWADRON,
*Examiners.*